United States Patent
Chen et al.

(10) Patent No.: US 6,487,863 B1
(45) Date of Patent: Dec. 3, 2002

(54) METHOD AND APPARATUS FOR COOLING HIGH TEMPERATURE COMPONENTS IN A GAS TURBINE

(75) Inventors: Allen G. Chen, Orlando, FL (US); Dennis A. Horazak, Orlando, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 0 days.

(21) Appl. No.: 09/822,387

(22) Filed: Mar. 30, 2001

(51) Int. Cl.⁷ .................................................. F02C 6/08

(52) U.S. Cl. ........................ 60/782; 60/39.12; 60/806

(58) Field of Search ........................... 60/782, 785, 806, 60/39.12

(56) References Cited

U.S. PATENT DOCUMENTS

| | | | |
|---|---|---|---|
| 4,224,045 A | 9/1980 | Olszewski | |
| 4,707,994 A | 11/1987 | Shenoy | |
| 4,785,621 A | * 11/1988 | Alderson et al. | ........... 60/39.12 |
| 5,081,845 A | 1/1992 | Allam | |
| 5,388,395 A | 2/1995 | Scharpf | |
| 5,406,786 A | 4/1995 | Scharpf | |

* cited by examiner

Primary Examiner—Ehud Gartenberg

(57) ABSTRACT

A combustion turbine having a compressed air cooling circuit that is connected to a nitrogen source. Compressed air is provided to the cooling circuit upon start-up and gradually switched to nitrogen cooling, as the nitrogen becomes available. Transition from compressed air to nitrogen cooling is supplied to the hottest components first in accordance with a pre-selected control scheme. Upon shutdown of the plant, the process is reversed.

10 Claims, 2 Drawing Sheets

METHOD AND APPARATUS FOR COOLING HIGH TEMPERATURE COMPONENTS IN A GAS TURBINE

FIELD OF THE INVENTION

This invention pertains generally to gas turbines and more particularly to high temperature gas turbines that employ a cooling medium to maintain the components within the working gas flow path within acceptable temperature limits.

BACKGROUND OF THE INVENTION

In most industrial combustion turbines, ambient air is drawn into the intake of a compressor, compressed and delivered to a combustion where it is combined with a fuel, ignited and transported through a transition member to a turbine wherein the working gas is expanded to produce mechanical energy. The compressor and turbine rotor are typically coupled to a common shaft so that rotation of the turbine rotor drives the compressor. Similarly, in power plant applications, the turbine rotor is also connected to a generator rotor to drive the generator to produce electricity.

A typical combustion turbine system 10 portion of such a power plant is illustrated in FIG. 1. Generally, the combustion turbine is made up of a compressor section 12, a combustion section 34 and a turbine section 41. The compressor section 12 is made up of a plurality of stationary vanes 14 supported by the outer housing and rotating blades 16 which are mounted on a common shaft 18. Each rotating blade row followed by a stationary vane row constitutes a compressor stage. FIG. 1 shows sixteen compressor stages. The compressor shown is also equipped with an inlet guide vane (IGV) 9, and an outlet guide vane (OGV) 29. The compressor is also arranged to form compressor bleed ports 22, 24 and 26 for bleeding compressed air for cooling high temperature turbine components. Ambient air 13 is introduced through an inlet 11 and successively compressed in each compressor stage, and it flows by all the bleed ports 22, 24 and 26, and the rest of compressor stages 28, and OGV 29 after which the compressed air travels through annular diffuser 30 to compressed air plenum 32 which surrounds the combustion 34 and transition member 36. A portion of the compressed air 13 can be diverted from each of the bleed ports for cooling turbine components as discussed above. A portion of the compressed air, as shown by the arrow, reverses direction in the plenum 32 and travels between the combustion housing 38 and the combustion shell 40 where it is directed to a combustion inlet and combined with fuel introduced through the nozzle inlets 42. The combined fuel and compressed air is burned in the combustion 34 to create a working gas which is directed through the transition member 36 to an inlet 44 to the first stage of the turbine 41. The turbine section 41 is made up of a serial arrangement of stationary vanes 52 and rotating blades 54. The rotating blades are supported by a common rotor system 56 and the vanes and blades are arranged in serial stages 44, 46, 48 and 50, which form the first through fourth stages of the turbine section. The working gas exiting the transition member 36 then expands through the stages 44, 46, 48 and 50 causing rotation of the blades 54 which in turn impart mechanical, rotational power to the rotor system 56. The turbine rotor system 56 is connected to the compressor shaft 18 so that rotation of the turbine rotor system 56 drives the compressor 12. Normally, in power plant applications, the rotor system 56 is coupled to the rotor of a generator to drive the generator to create electricity. The working gas ultimately is exhausted at the exit to the turbine 58 and directed through an exhaust stack to the ambient atmosphere.

It is generally desirable to have the turbine work at the highest efficiency possible. It is also known that the higher the temperature of the working gas, the higher the efficiency of the turbine. However, the upper temperature that the working gas can practically function at is limited by the temperature characteristics of the materials that it interfaces with. In addition, the higher the temperature of the combustion process and working gas, the more pollutants such as $NO_x$ that are created. Stringent environmental restrictions require such pollutants to be kept below a minimal level. These competing interests have been addressed by leaning out the combustion mixture to reduce flame temperature while maintaining an overall higher average thermal output and cooling the various components interfacing with the working gas flow path.

A system which has been employed for cooling the various turbine components is illustrated in FIG. 1. The cooling system shown is an open loop cooling system wherein compressed air is introduced into the various components and after traversing a cooling path within a component, is exhausted into the working gas within the turbine, providing power augmentation. To assure that the working gas does not backflow through the cooling system, the pressure of the compressed air has to be greater than that of the working gas at the point at which the cooling air is introduced into the working gas flow path. In this regard, air 60 is bled from the first bleed port 22 of the compressor and introduced at the fourth stage 50 of the turbine to cool the turbine stationery components before being introduced into the working gas flow path around the rotating blades 54 at a point where the working gas is at its lowest pressure among the turbine stages. Similarly, air 62 is bled from a second bleed port 24 of the compressor 12 and introduced at the third stage 48 of the turbine 41; and air 64 is bled from the third bleed port 26 of the compressor 12 and introduced at the second stage 46 of the turbine. The compressed air exiting the compressor outlet 30 is used to cool the combustion shell and liner and the transition member before being introduced into the working gas path within those components. The air 66 exiting the compressor outlet 30 is also used to cool the first stage of the turbine and further diverted, as represented by reference character 68, to cool the internal components of the rotor and the rotating blades 54, before being introduced into the working gas flow path. In this manner, the internal components of the combustion, transition and turbine are able to accommodate higher temperatures for greater overall turbine efficiency. However, diverting compressed air from the compressor for cooling has a negative affect on the efficiency of the operation of the turbine in that there is less air available for combustion and to be introduced at the first stage of the turbine for power conversion from thermal power to mechanical power. Accordingly, it is desirable to find another means of cooling the turbine components interfacing with the working gas flow path that does not require or minimizes the diversion of air from the compressor. Accordingly, it is an object of this invention to provide a system that minimizes the use of compressed air for cooling a turbine's internal components along the working gas flow path.

SUMMARY OF THE INVENTION

The instant invention takes advantage of a nitrogen source in a power plant to supply nitrogen in lieu of compressed air to at least a portion of the cooling circuit in a combustion turbine. In a preferred arrangement, the nitrogen is supplied from an air separation unit that separates oxygen from the nitrogen in the air for use in an integrated gasification combined cycle (IGCC) plant. Upon startup of the plant, air is initially supplied to the cooling circuit of the combustion turbine until the nitrogen becomes available. In one preferred arrangement, a cooling control system monitors the availability of nitrogen and controls valves within separate legs of the combustion turbine cooling circuit to supply the nitrogen in lieu of the compressed air sequentially, one leg at a time as the nitrogen becomes available. In a preferred scheme, the cooling leg corresponding to the hottest turbine components is supplied nitrogen first along with compressed air until sufficient nitrogen is available to replace the compressed air in that cooling leg completely. The control system next adds nitrogen to the next successive leg corresponding to the next hottest component, one leg at a time until preferably the nitrogen completely supplants the cooling air in the second, third and fourth stage of the turbine stator and the turbine rotor.

In the preferred arrangement, the cooling system controller also monitors the temperatures of the components being cooled and regulates the volume of nitrogen supplied to those components to maintain the temperature in an acceptable range.

BRIEF DESCRIPTION OF THE DRAWINGS

A full understanding of the invention can be gained from the following description when read in conjunction with the drawings in which.

DESCRIPTION OF THE PREFERRED EMBODIMENT

Figure 1:
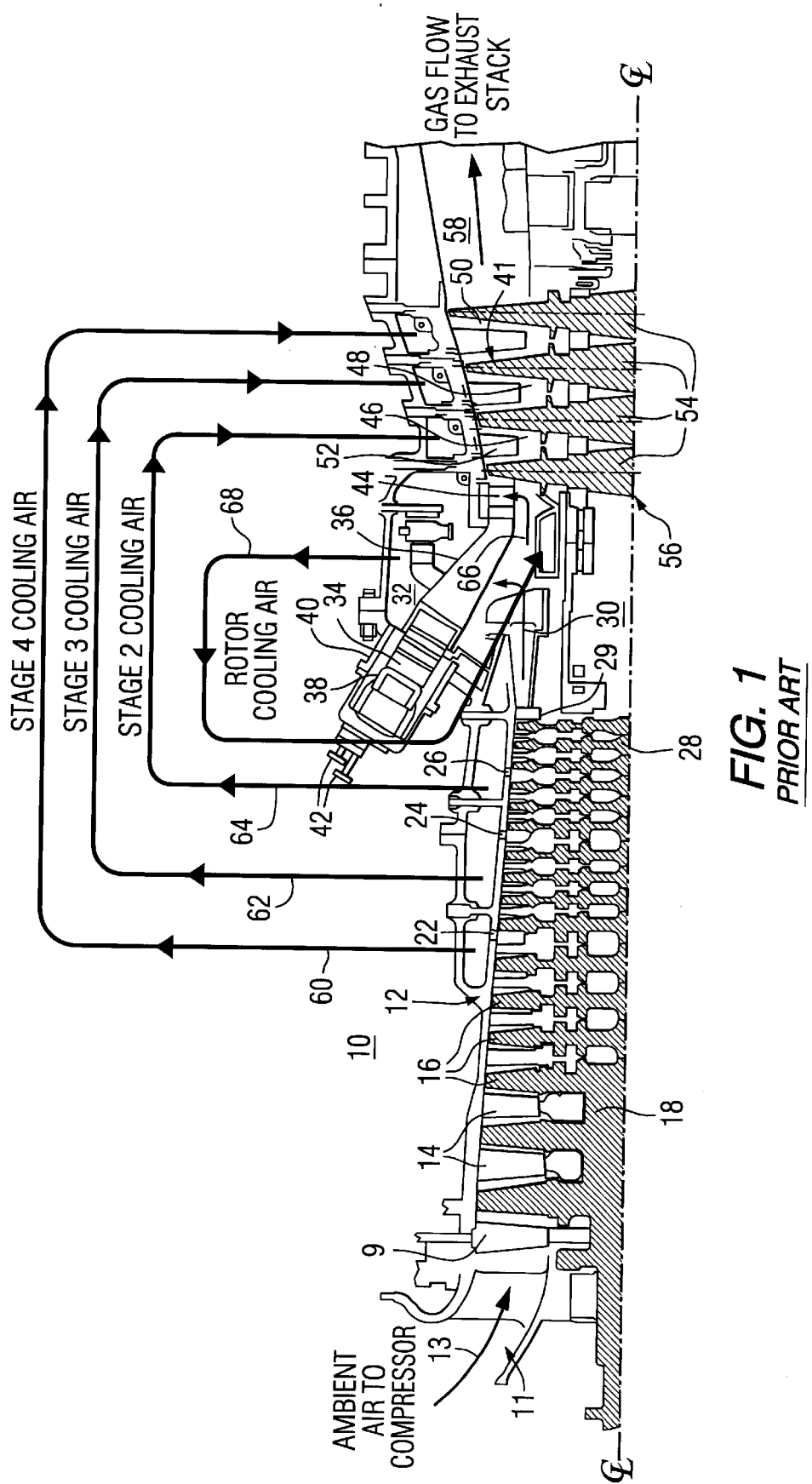
FIG. 1 is a schematic diagram of a combustion turbine illustrating a prior art cooling system scheme.
Figure 2:
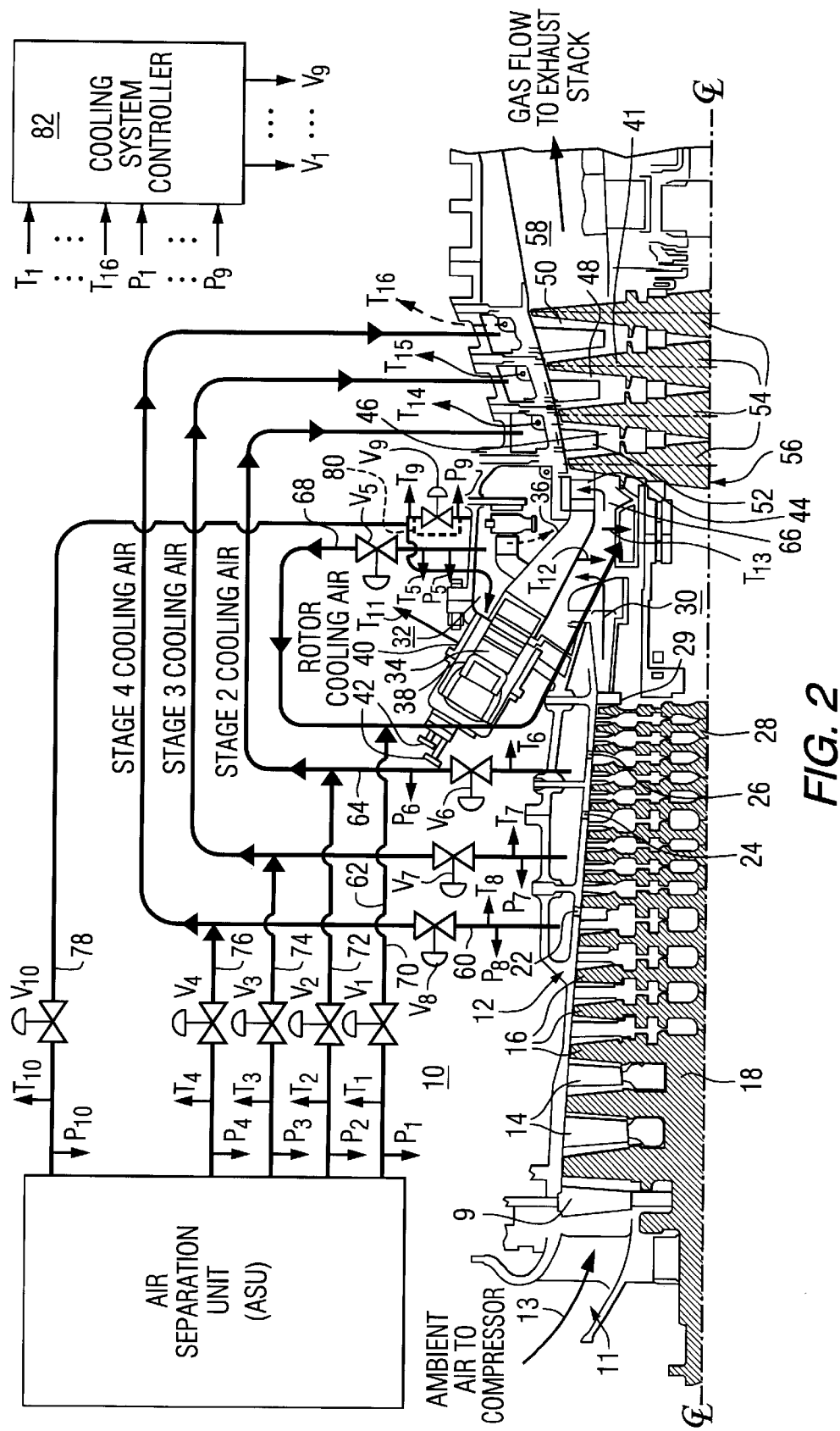
FIG. 2 is a schematic illustration of the combustion turbine of FIG. 1 modified to include an embodiment the cooling system of this invention.

FIG. 2 illustrates the combustion turbine of FIG. 1 with the cooling system modified in accordance with this invention. Like reference characters refer to like components on the several figures. Aside from the cooling system, the operation of the combustion turbine system 10 is the same as that previously described with respect to FIG. 1.

The cooling system illustrated in FIG. 2 includes valves $V_5$, $V_6$, $V_7$ and $V_8$ respectively in the cooling legs 68, 64, 62 and 60. An optional, additional cooling leg 80 is also shown together with nitrogen supply line 78 and will be discussed hereafter.

In accordance with this invention, nitrogen supply lines 76, 74, 72 and 70 are respectively connected to cooling legs 60, 62, 64 and 68 downstream of the corresponding air supply valves $V_8$, $V_7$, $V_6$ and $V_5$. Each of the nitrogen supply lines 70, 72, 74 and 76 is provided with its own flow control valve respectively, $V_1$, $V_2$, $V_3$ and $V_4$. In the illustrated embodiment, the nitrogen is supplied from an air separation unit normally used to provide a supply of oxygen, for example, to a coal gasification process as part of an integrated gasification combined cycle plant. Nitrogen is a by-product of that process that might otherwise be vented to the atmosphere.

In the case of the embodiment illustrated in FIG. 2, upon startup of the plant, valves $V_1$, $V_2$, $V_3$ and $V_4$ are closed and valves $V_8$, $V_7$, $V_6$ and $V_5$ are opened to respectively provide compressed air from the compressor bleed ports 22, 24 and 26 and the compressor outlet 30 to the cooling circuits 60, 62, 64 and 68. As the nitrogen pressure starts building up, valve $V_1$ is gradually opened and valve $V_5$ is gradually closed so that the nitrogen in supply line 70 supplants the air in cooling leg 68 to supply the rotor with nitrogen. When sufficient nitrogen is available to more than completely supplant the rotor cooling air in cooling leg 68, valve $V_2$ in nitrogen supply line 72 is gradually opened and valve $V_6$ in cooling leg 64 is gradually closed. The control of valves $V_2$ and $V_6$ is coordinated to continue to convey a sufficient amount of cooling gas to the second stage of the turbine stator through cooling leg 64 to maintain the pressure of the coolant above that of the working gas in the second stage and to satisfy cooling requirements. When sufficient nitrogen is available to completely supplant the compressed air and maintain adequate cooling in the second stage, then the same process is repeated for the third stage and then the fourth stage.

Preferably, nitrogen cooling is first supplied to the hottest components because they are most likely otherwise to experience the most oxidation. The inert properties of nitrogen reduce the possibility of high temperature chemical reactions such as oxidation and thus enhance the life of the components. Upon shutdown of the air separation unit, the process is reversed and valves $V_5$, $V_6$, $V_7$ and $V_8$ are opened and valves $V_1$, $V_2$, $V_3$ and $V_4$ are closed and the cooling system is switched to compressed air cooling.

In another preferred embodiment, the cooling system of this invention includes a cooling system controller 82 that receives pressure and temperature signals $P_1$, $T_1$, $P_2$, $T_2$, $P_3$, $T_3$, $P_4$ and $T_4$ corresponding to the pressure and temperature of the nitrogen in supply lines 70, 72, 74 and 76 respectively. The cooling system controller 82 also receives temperature and pressure signals $T_5$, $P_5$, $T_6$, $P_6$, $T_7$, $P_7$, $T_8$ and $P_8$ respectively from cooling legs 68, 64, 62 and 60. From these signals, the cooling system controller 82 computes the availability of nitrogen to supply lines 70, 72, 74 and 76 and the cooling capacity of the nitrogen in those lines as well as the cooling capacity of the compressed air in cooling legs 68, 64, 62 and 60. Desirably, the cooling system controller 82 also receives temperature signals $T_{13}$, $T_{,14}$, $T_{,15}$ and $T_{,16}$ corresponding to the rotor and respective turbine stages that are connected to the nitrogen cooling system. From these latter temperature signals, the cooling system controller 82 can determine the cooling requirements of the turbine components and control the valves $V_1$, $V_2$, $V_3$, $V_4$, $V_5$, $V_6$, $V_7$ and $V_8$ accordingly to assure there is adequate cooling for those components. The algorithms for making those calculations are well within the state of the art.

Adding nitrogen cooling to the combustion shell, transition and first stage of the turbine requires additional modification to the cooling circuit which is schematically illustrated by the additional cooling leg 80. While substantial benefit can be received form this invention without the cost of this additional cooling leg, an additional reduction in compressor bleed for cooling purposes can be achieved with such a modification. It is not practical to introduce the nitrogen directly into the compressed air plenum 32 surrounding the combustion and transition because that would substantially dilute the compressed air entering the combustion, which is necessary for the combustion process. However, the combustion shell can include a closed cooling path and the additional cooling leg 80 can be connected directly to that cooling path as well as to the transition and first stage so that the nitrogen would be introduced into the working gas downstream of the combustion zone in the combustion 34. Temperature signals $T_{11}$, and $T_{12}$ can then be routed to the cooling system controller along with temperature and pressure signals $T_9$, $P_9$ from the additional cooling leg 80 and temperature signals $T_{10}$, $P_{10}$ from the additional nitrogen supply line 78, to control valves $V_9$ and $V_{10}$, to provide the required nitrogen cooling to the combustion, transition and first stage of the turbine, as described for the other components heretofore. In this manner, a maximum amount of compressor air is available for power augmentation at the first stage of the turbine. Additional efficiency is achieved through power augmentation supplied by the nitrogen cooling gas exhausted into the working gas stream.

The use of nitrogen from an air separation unit in place of compressed air from the turbine compressor for turbine component cooling has a number of benefits. Firstly, the invention provides additional turbine power augmentation as a result of the additional air that is available at the first turbine stage, while still making the air available for cooling upon startup, shutdown or the unavailability of the nitrogen supply. The blade cooling air only produces power from its point of insertion into the blade path to the turbine exit. Substituting nitrogen as a coolant allows more air to produce power along the entire length of the blade path. A second benefit is reduced loading on the cooling air cooler normally used to reduce the temperature of the compressed cooling air to an acceptable level. Lowering air cooling temperatures discards some heat produced by the gas turbine compressor before it can be used to produce power in the expander sections, resulting in reduced turbine efficiency. A third benefit is the relatively low temperature of the nitrogen, coming from the air separation unit, which is typically about 200° F. (111° C.) cooler than the cooling air would have been, reducing the requirement for coolant flow through the rotor and blades. A fourth benefit of replacing cooling air with nitrogen is the inert property of the nitrogen, which can be beneficial to the metal of the turbine components by reducing the possibility of high temperature chemical reactions such as oxidation, which would be a potential problem with cooling air.

Either full or partial nitrogen cooling can be used in the gas turbine. Full cooling means that the air is replaced by nitrogen in all cooling networks, while partial cooling means that air is replaced by nitrogen in only some of the cooling networks. The substitution of nitrogen for air in the rotor cooling network is the most beneficial to the turbine performance because the cooling air would have been taken from the compressor at its highest pressure condition, then cooled to meet the cooling requirements of the rotor. The next most beneficial location for nitrogen substitution is stage 2, then stage 3, and finally stage 4, which shows the least performance improvement. The additional cooling leg 80 is not significant to increasing the efficiency of the turbine since the compressed air would be introduced into the working gas upstream of the first stage of the turbine. However, it does provide additional mass flow through the turbine, which produces additional power, and it provides the advantage of minimizing the chemical reaction of the cooling gas on the turbine components. Accordingly, the additional leg 80, while not necessary to this invention, can provide benefit.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A combustion turbine system comprising:
    a) A compressor for compressing air from an air source and delivering the compressed air to a compressor output;
    b) A combustion for igniting a fuel, received from a fuel source, in a mixture of compressed air received from the compressor output to form a working gas which is communicated to an output section of the combustion:
    c) A transition member coupled at an upstream end to the output section of the combustion for receiving and directing the working gas to a downstream end of the transition member:
    d) A turbine connected at one end to the downstream end of the transition section, for receiving and expanding the working gas:
    e) A compressed air conduit connected at one point to the compressor for bleeding off at least a portion of the air compressed in the compressor, and at a second point to a cooling conduit that is in flow communication with a cooling circuit in at least one of said combustion, transition member and turbine for cooling a component thereof;
    f) A nitrogen source;
    g) A nitrogen conduit connected at one point to the nitrogen source and at a second point to the cooling conduit; and
    h) A device for metering the volume of air flow through said compressed air conduit to said cooling conduit and the volume of nitrogen flow through said nitrogen conduit to said cooling conduit for controlling the proportion of nitrogen to air content of a cooling gas delivered to cool said component.

2. The combustion system of claim 1 wherein the proportion or nitrogen to air is controlled in accordance with a pre-selected control scheme.

3. The combustion system of claim 2 wherein the metering device monitors a cooling requirement of the component and the quantity of nitrogen available and meters the compressed air to the cooling conduit to make up any deficiency in the available nitrogen to satisfy the cooling requirement of the component.

4. The combustion system of claim 3 wherein the nitrogen source is an air separation unit of an Integrated Gasification Combined Cycle Plant and the metering device provides 100 percent compressed air cooling on start up and transitions to nitrogen cooling as the availability of nitrogen increases.

5. The combustion system of claim 4 wherein the control scheme transfers from 100 percent compressed air in the cooling gas to substantially 100 percent nitrogen in the cooling gas as the availability of nitrogen increases.

6. The combustion system of claim 5 wherein the cooling circuit includes a plurality of cooling paths and the metering device controls the proportion of nitrogen to air separately in at least two of said cooling paths and wherein the percentage of nitrogen to air is increased in a first of said plurality of cooling paths to substantially 100 percent nitrogen before any substantial amount of nitrogen is added to a second of said plurality of cooling paths.

7. The combustion system of claim 6 wherein the first of said plurality of cooling paths is a first stage of said turbine and a second of said plurality of cooling paths is a second stage of said turbine.

8. The combustion system of claim 6 wherein the sequence of said plurality of cooling paths that the nitrogen is communicated to extends substantially from the path corresponding to the component having the highest temperature to the path corresponding to the component having the relatively coolest temperature.

9. The combustion system of claim 3 wherein the metering device monitors the pressure of the nitrogen in the nitrogen conduit and the temperature of the component to determine the cooling requirements of the component and the quantity of nitrogen available.

10. The combustion system of claim 7 wherein the metering device further monitors the pressure of compressed air in the compressed air conduit.

* * * * *